US008812916B2

(12) United States Patent
Abdul et al.

(10) Patent No.: US 8,812,916 B2
(45) Date of Patent: Aug. 19, 2014

(54) FAILURE DATA MANAGEMENT FOR A DISTRIBUTED COMPUTER SYSTEM

(75) Inventors: Anis M. Abdul, Austin, TX (US);
Andrea Yin-Shih Ma, Austin, TX (US);
Ajay K. Mahajan, Austin, TX (US);
Nicholas A. Pietraniec, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 13/151,985

(22) Filed: Jun. 2, 2011

(65) Prior Publication Data

US 2012/0311391 A1    Dec. 6, 2012

(51) Int. Cl.
*G06F 11/00*    (2006.01)

(52) U.S. Cl.
USPC ............... 714/48; 714/4.1; 714/4.11; 714/11; 709/223; 709/224

(58) Field of Classification Search
USPC ...................................... 714/48, 4.1, 4.11, 11
See application file for complete search history.

(56) References Cited

U.S. PATENT DOCUMENTS

| 5,968,189 | A * | 10/1999 | Desnoyers et al. ......... 714/47.2 |
| 6,651,183 | B1 | 11/2003 | Gensler, Jr. et al. |
| 6,915,381 | B2 | 7/2005 | Fujie et al. |
| 7,111,197 | B2 | 9/2006 | Kingsbury et al. |
| 7,146,523 | B2 | 12/2006 | Allen et al. |
| 7,308,609 | B2 | 12/2007 | Dickenson et al. |
| 7,418,635 | B2 | 8/2008 | Schulstad |
| 7,681,089 | B2 | 3/2010 | Ashmore |
| 2002/0069340 | A1 | 6/2002 | Tindal et al. |
| 2003/0191992 | A1 * | 10/2003 | Kaminsky et al. ............ 714/712 |
| 2003/0204539 | A1 | 10/2003 | Bergsten |
| 2004/0066741 | A1 * | 4/2004 | Dinker et al. ................. 370/216 |
| 2005/0108593 | A1 * | 5/2005 | Purushothaman et al. ....... 714/4 |
| 2008/0201616 | A1 * | 8/2008 | Ashmore ........................ 714/57 |
| 2009/0070639 | A1 * | 3/2009 | Langford et al. ............... 714/57 |
| 2009/0241136 | A1 | 9/2009 | Clark et al. |
| 2009/0248856 | A1 | 10/2009 | Chatterjee et al. |
| 2010/0039931 | A1 * | 2/2010 | Shi et al. ....................... 370/216 |
| 2010/0082551 | A1 * | 4/2010 | Kathuria et al. ............... 707/674 |

(Continued)

FOREIGN PATENT DOCUMENTS

WO    2008/004149 A2    1/2008

OTHER PUBLICATIONS

International Business Machines, "Enhanced First Failure Data Capture" www.ip.com, Aug. 8, 2007 (4 pages).

(Continued)

*Primary Examiner* — Chae Ko
(74) *Attorney, Agent, or Firm* — James L. Baudino (57) ABSTRACT

Various systems, processes, products, and techniques may be used to manage failure data for a distributed computer system. In particular implementations, a system and process for managing distributed data for a distributed computer system may include the ability to determine at a service processor of a first node in a distributed computer system that comprises a plurality of nodes whether a failure has occurred in the first node and identify a service processor of a second node in the distributed computer system in which to store failure data if a failure has occurred. The system and process may also include the ability to store at least part of the failure data in the identified service processor and determine whether there is more failure data to store than the identified service processor can store.

20 Claims, 4 Drawing Sheets

(56) References Cited

U.S. PATENT DOCUMENTS

| | | |
|---|---|---|
| 2010/0088541 A1 | 4/2010 | Tanaka et al. |
| 2010/0138687 A1* | 6/2010 | Noguchi et al. ............... 714/4 |
| 2010/0180021 A1 | 7/2010 | Abdul et al. |
| 2010/0199125 A1 | 8/2010 | Reche |
| 2012/0036394 A1* | 2/2012 | Feng ........................ 714/4.12 |
| 2012/0254342 A1* | 10/2012 | Evans ........................ 709/214 |
| 2012/0324285 A1* | 12/2012 | Li et al. ........................ 714/20 |

OTHER PUBLICATIONS

Sun, Hai T., "First Failure Data Capture in Embedded System", IEEE EIT 2007 Proceedings, 2007, pp. 183-187, IEEE (5 pages).

Demetrescu, Camil, et al.—"Oracles for Distances Avoiding a Node or Link Failure", SIAM Journal on Computing, ISSN 0097-5397-2008, vol. 37, No. 5, Jun. 4, 2008, pp. 1299-1318—article 27 ref. (13 pages).

Francalanza, Adrian, et al.—"A Theory of System Behaviour in the Presence of Node and Link Failure", Information and Computation, vol. 206 Issue 6, Jun. 1, 2008 (63 pages).

Ho, Richard C., et al.—"Architecture Validation for Processors", ISCA '95 Proceedings of the 22nd Annual International Symposium on Computer Architecture, Jun. 1995, pp. 404-413 (10 pages).

Leonard, Derek, et al.—"On Lifetime-Based Node Failure and Stochastic Resilience of Decentralized Peer-to-Peer Networks", IEEE/ACM Transactions on Networking, vol. 15, No. 5, Oct. 2007 (13 pages).

Abdul, Anis M., et al.—"Node Controller First Failure Error Management for a Distributed System", U.S. Appl. No. 12/775,195, filed May 6, 2010 (36 pages).

* cited by examiner

FAILURE DATA MANAGEMENT FOR A DISTRIBUTED COMPUTER SYSTEM

BACKGROUND

The present invention relates to distributed computer systems, and more specifically to failure data for distributed computer systems.

Enterprise class computer systems typically include a larger number of controllers (e.g., hundreds) that are each responsible for managing a set of hardware (e.g., one or more computer systems) of the systems. When the controllers and/or the managed hardware experience a failure, the controllers may gather diagnostic data regarding the event and send it to higher level systems, at which it may be analyzed and/or reported. This data may be used to diagnose the causes of errors and, in some cases, reduce the need to reproduce errors.

BRIEF SUMMARY

In one implementation, a process for managing failure data may include determining at a service processor of a first node in a distributed computer system that includes a plurality of nodes whether a failure has occurred in the first node and identifying a service processor of a second node in the distributed computer system in which to store failure data if a failure has occurred. The process may also include storing at least part of the failure data in the identified service processor and determining whether there is more failure data to store than the identified service processor can store. The process may, for example, be executed by a processor.

The details and features of various implementations will be conveyed by the following description, along with the drawings.

DETAILED DESCRIPTION

Failure data for a distributed computer system may be managed by various techniques. In particular implementations, a service processor that manages a portion of a distributed system may manage the reporting of failure data for its portion. The failure data may, for example, allow a failure to be diagnosed and corrected without having to recreate the failures. In managing the failure data, the service processor may attempt to store the failure data in a service processor that coordinates a number of service processors, and failing that, the service processor may store the data in a number of similar service processors, which may provide increased storage.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

Figure 1:
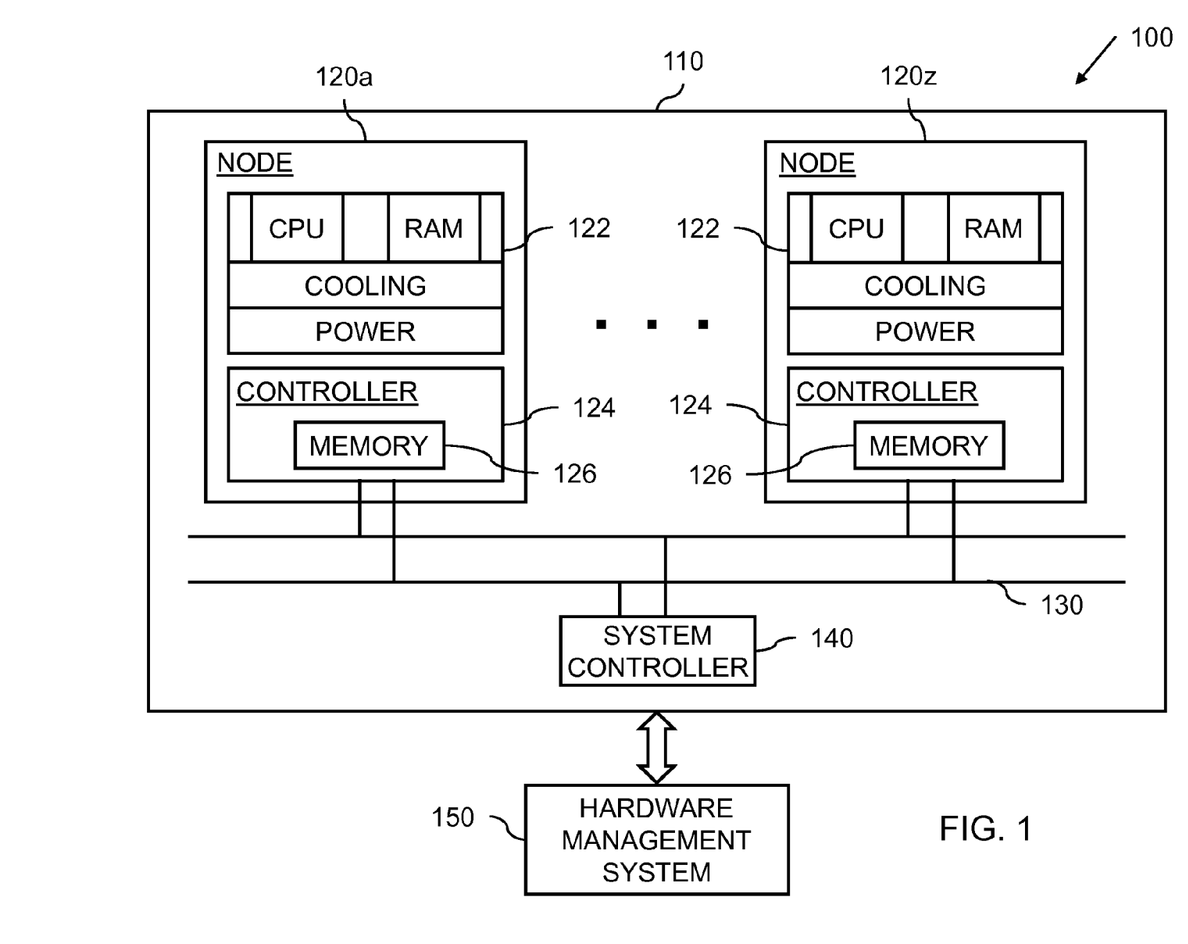
FIG. 1 is a block diagram illustrating an example distributed computer system for which failure data may be managed.

FIG. 1 illustrates an example system 100 for which failure data may be managed. System 100 includes a distributed computer system 110, which includes a number of nodes 120 and a system controller 140, and a hardware management system 150. Distributed computer system 110 may, for example, be an enterprise-class server system.

Each of nodes 120 includes a collection of hardware 122 that is managed by a controller 124. As illustrated, hardware 122 includes a central processing unit, random access memory, a cooling system, and a power supply system. Thus, hardware 122 may be a single computer system. In other implementations, hardware 122 may include various collections and combinations of processor units, memory, drives, cooling systems, and/or power supplies. Hardware 122 may also be a multitude of computer systems.

In managing hardware 122, node controllers 124 may, for example, be responsible for providing initialization and configuration for the hardware. Node controllers 124 typically perform their management functions under the coordination and control of system controller 140. In particular implementations, node controllers 124 may be service processors embedded in nodes 120 and communicate to the hardware through a communication link (e.g., a field support interface (FSI) bus).

System controller 140 provides coordination and control for node controllers 124 in nodes 120. For example, system controller 140 may control initialization and configuration and provide error handling. In accomplishing this, the system controller may detect what hardware is present in distributed system 110, provide instructions to initialize the hardware that is present (e.g., load operating systems), and provide instructions to configure the hardware (e.g., establish partitions). Furthermore, during operation, the system controller may check for errors and manage hardware switch-overs if errors are present. In certain implementations, system controller 140 may be a service processor.

System controller 140 may generally serve as the primary coordination and collection point for errors in distributed system 110. As part of this, the system controller may track and report the errors to hardware management system 150, which is an external computer system that provides management access to distributed system 110.

In operation, nodes 120 may experience a variety of failure conditions. For example, a node 120 may experience various hardware errors (e.g., access errors on busses). The device drivers for an application may, for instance, detect a problem with hardware. As another example, a node may experience problems with memory (e.g., memory leaks). As a further example, an error may occur in a non-processing system (e.g., a power supply or cooling unit). Various other type failures may also occur (e.g., communication failure errors, application or process failure errors, crashes or locking up of a particular node or node controller operation, as well as other errors). Thus, a failure condition may cause a localized problem or a node-wide problem. Moreover, a failure does not have to critically endanger the operation of a node, at least on an immediate basis.

When a failure occurs, various data may be useful in evaluating the cause. For example, hardware and applications may generate error logs and/or traces. Additionally, file system data and hardware register data may be retrieved. Node controllers 124 are responsible for collecting the appropriate failure data and storing it for the associated nodes 120.

In certain modes of operation, the node controller 124 of a node 120 experiencing a failure may first attempt to store the failure data in system controller 140. As part of this process, the node controller 124 may determine whether communication with system controller 140 is possible.

Node controllers 124 and system controller 140 communicate with each other over a communication network 130, which may operate through a variety of techniques. For example, in certain implementations, node controllers 124 and system controller 140 may communicate via a virtual local area network established over Ethernet links. Various problems may prevent a node controller from communicating with system controller 140. For example, a communication error may result from communication hardware in a node controller, communication links, intervening hardware (e.g., a switch), and/or communication hardware in the system controller. Moreover, the system controller itself may be experiencing a failure.

If a node controller 124 handling a failure cannot communicate with system controller 140, the node controller may determine a node controller 124 in which to store the failure data. Each of node controllers 124 has associated memory 126, which could, for example, include RAM, ROM, and flash memory, and the node controller 124 handling the failure may store the failure data in its own memory or the memory of another node controller 124. Each node controllers 124 may, for example, have a small portion of its memory 126 (e.g., 1 Megabyte) designated for failure data, and the mapping of the failure data storage locations could be known to each node controller 124. The handling node controller may store the failure data in the portion of memory 126 of the identified node controller 124.

In particular implementations, for example, node controllers 124 may share a pointer that directs the node controllers regarding which node controller to store failure data in. Thus, the node controller handling a failure will be able to determine where to store the failure data. Moreover, the starting position may not necessarily be with the handling node controller.

Additionally, node controllers 124 may understand the amount of memory available for storing failure data in other node controllers 124. For example, the amount of memory available for storing failure data may be a configuration parameter, and a mapping algorithm using the node controller sequence identifier may be available in the node controllers as part of a standard code load. Thus, a handling node controller may send the appropriate amount of data to a storing node controller. Moreover, once the storing node controller is full, the handling node controller may direct additional failure data, if any, to another node controller. This may, for example, be accomplished by following a predefined progression. The handling node controller 124 may also continue to store failure data in successive node controllers 124 according to the progression. In certain situations, for example, the amount of failure data for one failure event may be enough to fill the allocated failure data storage of several node controllers 124. The node controllers may therefore act as a distributed buffer for storing the failure data. In certain implementations, however, the handling node controller may skip itself (e.g., if a catastrophic event is occurring).

In particular implementations, a handling node controller 124 may add an identifier to the stored failure data. For example, a time stamp could be added to each set of stored failure data. This can assist system controller 140 in making sure the failure data is assembled in the proper order. Moreover, it can assist in determining which failure data is associated with which failure event.

At a later point in time, system controller 140 may retrieve the failure data from the appropriate node controllers 124. For example, system controller 140 may retrieve the failure data when prompted by hardware management system 150, which could request the data based on an event (e.g., an error event in the hardware management system could trigger a service action that will query the system controller to retrieve available failure data). As another example, one or more node controllers 124 could trigger the availability of the failure data to an external client application, which could initiate the retrieval of the failure data.

In particular implementations, system controller 140 may retrieve the failure data by determining the current failure data storage location pointer in the node controllers 124. For example, the system controller could query a node controller for the current pointer. Then, the system controller may retrieve the failure data from the node controller identified by the pointer. Moreover, the system controller may progress from node controller to node controller retrieving the failure data based on the reverse progression of the pointer. In other implementations, system controller 140 may query each node controller to report its failure data, if any.

In some situations, a node 120, or a combination of nodes 120, may experience multiple failures before communication is reestablished with system controller 140. In these situations, a node controller 124 handling a second failure may continue to store failure data beginning at the end of the failure data stored by the first handling node controller 124. Thus, node controllers 124 may store failure data for a number of failure events Furthermore, in certain situations, some of node controllers 124 may be able to communication with system controller 140 when the node controller handling a failure event cannot. Thus, the system controller can retrieve failure data about an event even when communication with the handling node controller is not possible.

In particular situations, the amount of failure data, whether due to one event or multiple events, may be more than the node controllers 124 in combination can store. In these situations, the handling node controller may continue to store data in the prescribed progression. Thus, earlier stored failure data may be erased in favor of later failure data.

System 100 has a variety of features. For example, by being able to store failure data in a number of node controllers, the amount of failure data that can be stored by a node controller handling a failure event can effectively be multiplied by the number of node controllers in distributed system 110. Thus, more detailed failure data and/or failure data from multiple events may be stored, which may provide better insight into the cause of the failure event(s). Moreover, system controller 140 may retrieve the failure data at its convenience because the failure data is not overwritten just because another failure event occurs. As another example, the failure data can be stored even if communication with system controller 140 is not possible.

In other implementations, system 100 may include fewer or additional components. For example, some implementations may include redundant node controllers and/or a redundant system controller. In these situations, the redundant node controllers may also store failure data, which can effectively double to amount of failure data stored by node controllers 124. For example, the redundant node controllers may be viewed as ordinary node controllers as far as storing the failure data. For instance, the progression of a node controller location pointer may include the redundant node controllers. The redundant node controllers may, for instance, be coupled to node controllers 124 by point-to-point links (e.g., though fibers).

In certain implementations, system controller 140 may be any service processor wanting to receive failure data but having a malfunctioning connection to the service processor from which it wants data. Additionally, node controllers 124 may be any service processor that collects failure data and wants to send it to another service processor.

Figure 2:
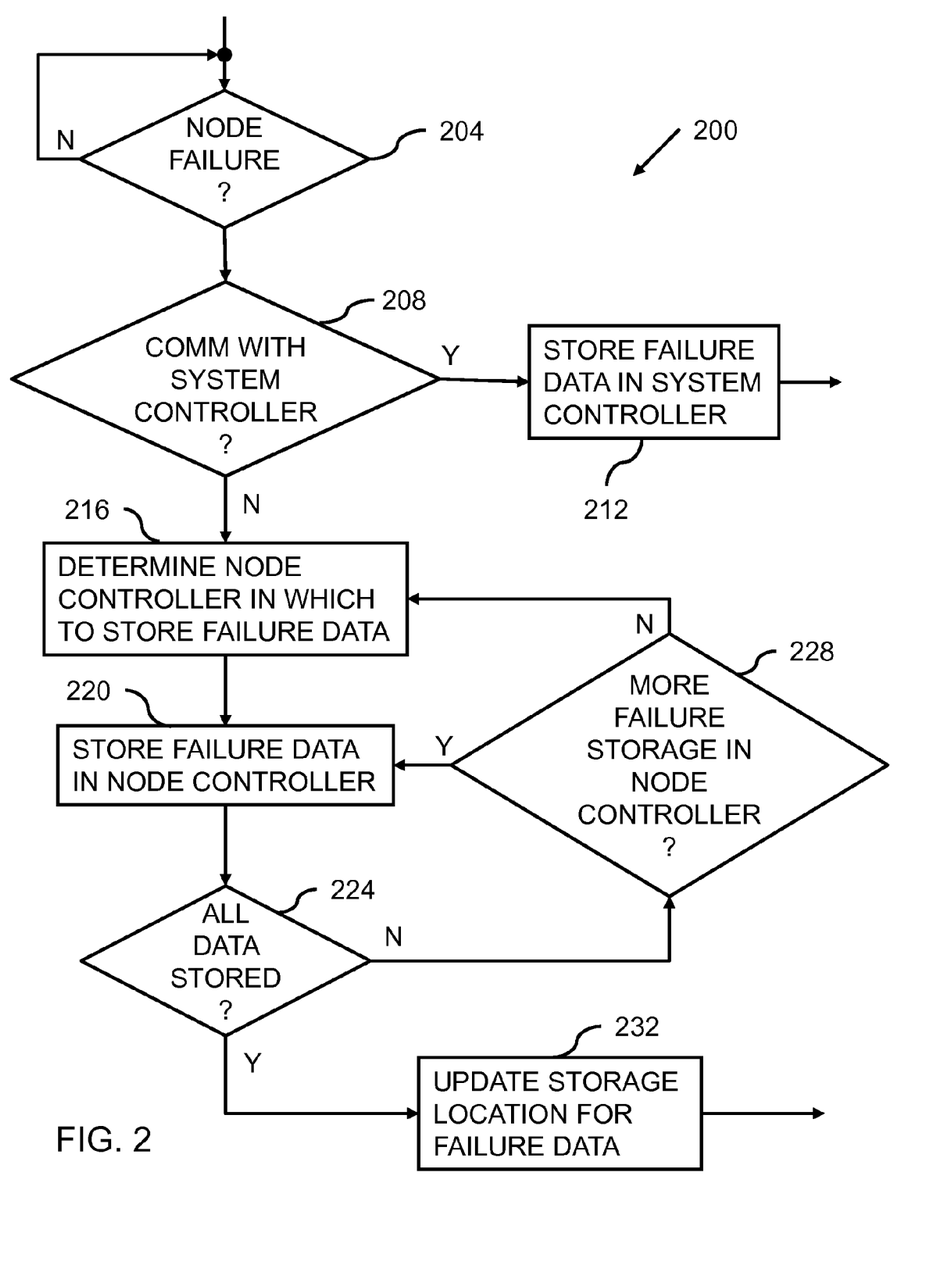
FIG. 2 is a flowchart illustrating an example process for managing failure data for a distributed computer system.

FIG. 2 illustrates an example process 200 for managing failure data for a distributed computer system. Process 200 may, for example, be implemented by a node controller in a distributed computer system.

Process 200 calls for determining whether a failure has occurred in a node of a distributed system (operation 204). A failure may, for example, be detected by receiving hardware access errors. If a failure has not occurred, process 200 continues to wait for a failure to occur.

Once a failure does occur, process 200 calls for determining whether communication with a system controller of the distributed system is available (operation 208). Determining whether communication with a system controller is available may, for example, be accomplished by determining whether the system controller responds to queries. If communication with the system controller is available, process 200 calls for storing failure data in the system controller (operation 212). Process 200 is then at an end.

If, however, communication with the system controller is not available, process 200 calls for determining a node controller in the distributed system in which to store failure data (operation 216). In certain implementations, for example, the node controllers in a distributed system may share a pointer that indicates the node controller in which failure data should be stored. Process 200 then calls for storing at least part of the failure data in the identified node controller (operation 220). The failure data may, for example, be stored in the identified node controller by using a distributed InterProcess Communication (IPC) mechanism (e.g., Common Object Request Broker Architecture (CORBA)).

Process 200 also calls for determining whether all of the failure data has been stored (operation 224). For example, more failure data may be generated while the earlier failure data is being stored. If all of the failure data has not been stored, process 200 calls for determining whether there is additional storage for failure data available in the identified node controller (operation 228). The node controller handling the failure may, for example, query the identified node controller regarding the amount of space available.

If more storage for failure data is available in the identified node controller, process 200 calls for again storing failure data in the identified node controller (operation 220). If, however, more storage for failure data is not available in the identified node controller, process 200 calls for determining another node controller in which to store the additional failure data (operation 216). The node controller for storing the additional failure data may, for example, be identified by examining a predefined progression for a node controller pointer.

Once all of the failure data has been stored, process 200 calls for updating the storage location for the failure data (operation 232). For example, a pointer that indicates the node controller in which to store failure data may be updated to the node controller that was last used to store failure data during process 200. This pointer may also be distributed to other node controllers. Process 200 is then at an end.

Process 200 may be performed multiple times for a distributed system. For example, a node controller may experience multiple failures. Thus, the node controller may store failure data for successive failures in node controllers of the distributed system. Additionally, multiple node controllers may experience a failure. Thus, the distributed system's node controllers may store failure data for multiple failure events.

Although FIG. 2 illustrates an example process for managing failure data for a distributed computer system, other processes for managing failure data for a distributed computer system may include fewer, additional, and/or a different arrangement of operations. For example, a process may not include determining whether communication is available with a system controller. In particular implementations, the failure data storage in a system controller may be limited. Thus, the node controllers grouped together may provide more storage than the system controller. As another example, updating the storage location for failure data may be performed as additional node controllers for storing the failure data are identified. As a further example, a node controller handling a failure may first determine how much failure data an identified node controller can store before sending it failure data to store.

Figure 3:
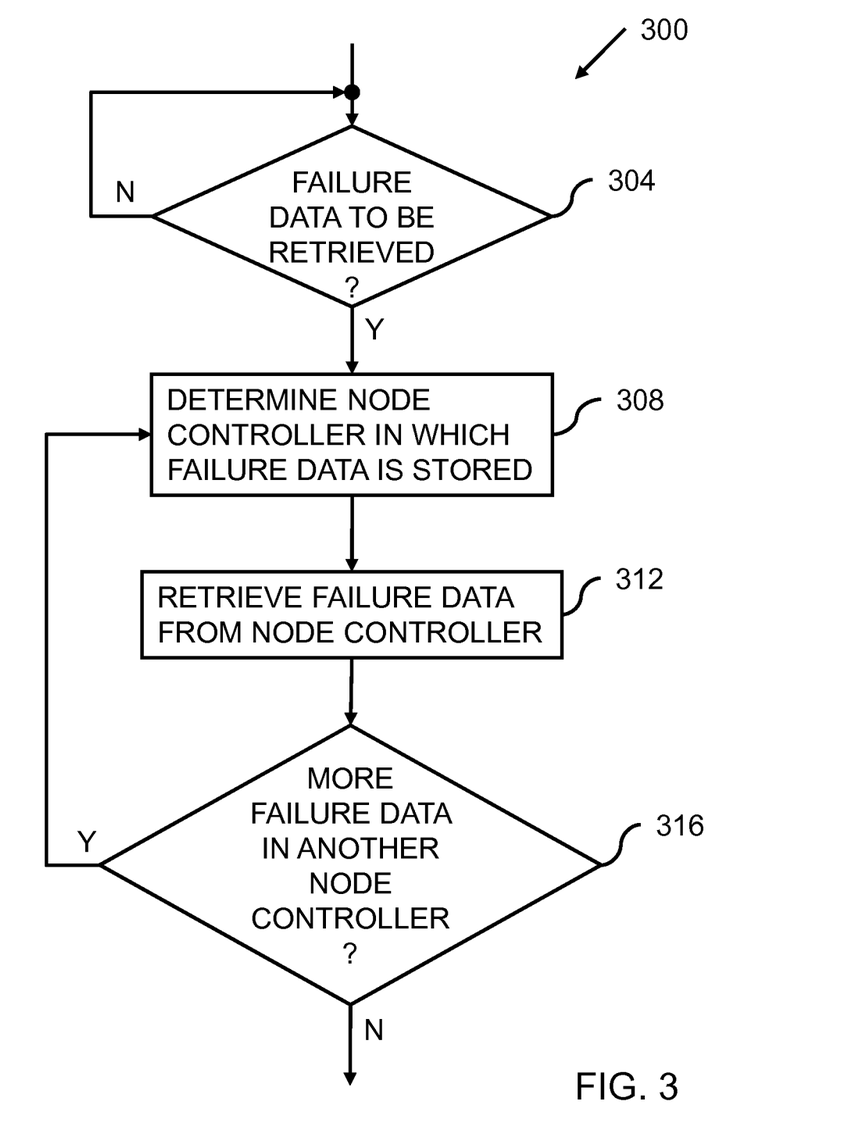
FIG. 3 is a flowchart illustrating another example process for managing failure data for a distributed computer system.

FIG. 3 illustrates another example process 300 for managing failure data for a distributed computer system. Process 300 may, for example, be performed by a system controller in a distributed computer system.

Process 300 calls for determining whether there is failure data to be retrieved from a node controller (operation 304). Determining whether there is failure data to be retrieved may, for example, occur when a node controller provides a notification that it is storing failure data. If there is not failure data to be retrieved, process 300 calls for waiting for failure data to be retrieved.

Once there is failure data to be retrieved, process 300 calls for determining a node controller in which failure data is stored (operation 308). Determining a node controller storing failure data may, for example, be accomplished by querying a node controller regarding where failure data is located. Process 300 then calls for retrieving failure data from the identified node controller (operation 312).

Process 300 also calls for determining whether there is additional failure data in another node controller (operation 316). Determining whether there is additional failure data may, for example, be accomplished by querying a successive node controller in a failure data storage progression. If there is additional failure data in another node controller, process 300 calls for determining the node controller in which the additional failure data is stored (operation 308) and retrieving the failure data from the identified node controller (operation 312). Once the failure data in the node controllers has been retrieved, process 300 is at an end.

Process 300 may be performed multiple times for a distributed system. For example, node controllers may experience multiple failures and store failure data for successive failures in node controllers of the distributed system. Thus, there may be failure data to be retrieved at many points during operation.

Although FIG. 3 illustrates an example process for managing failure data for a distributed computer system, other processes for managing failure data for a distributed computer system may include fewer, additional, and/or a different arrangement of operations. For example, a process may not include determining a node controller in which failure data is stored. For instance, failure data could be requested from all node controllers. In these situations, the failure data could be reassembled into an appropriate order based on one or more identifiers in the failure data (e.g., a timestamp).

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems the perform the specified function or acts, or combinations of special purpose hardware and computer instructions.

Figure 4:
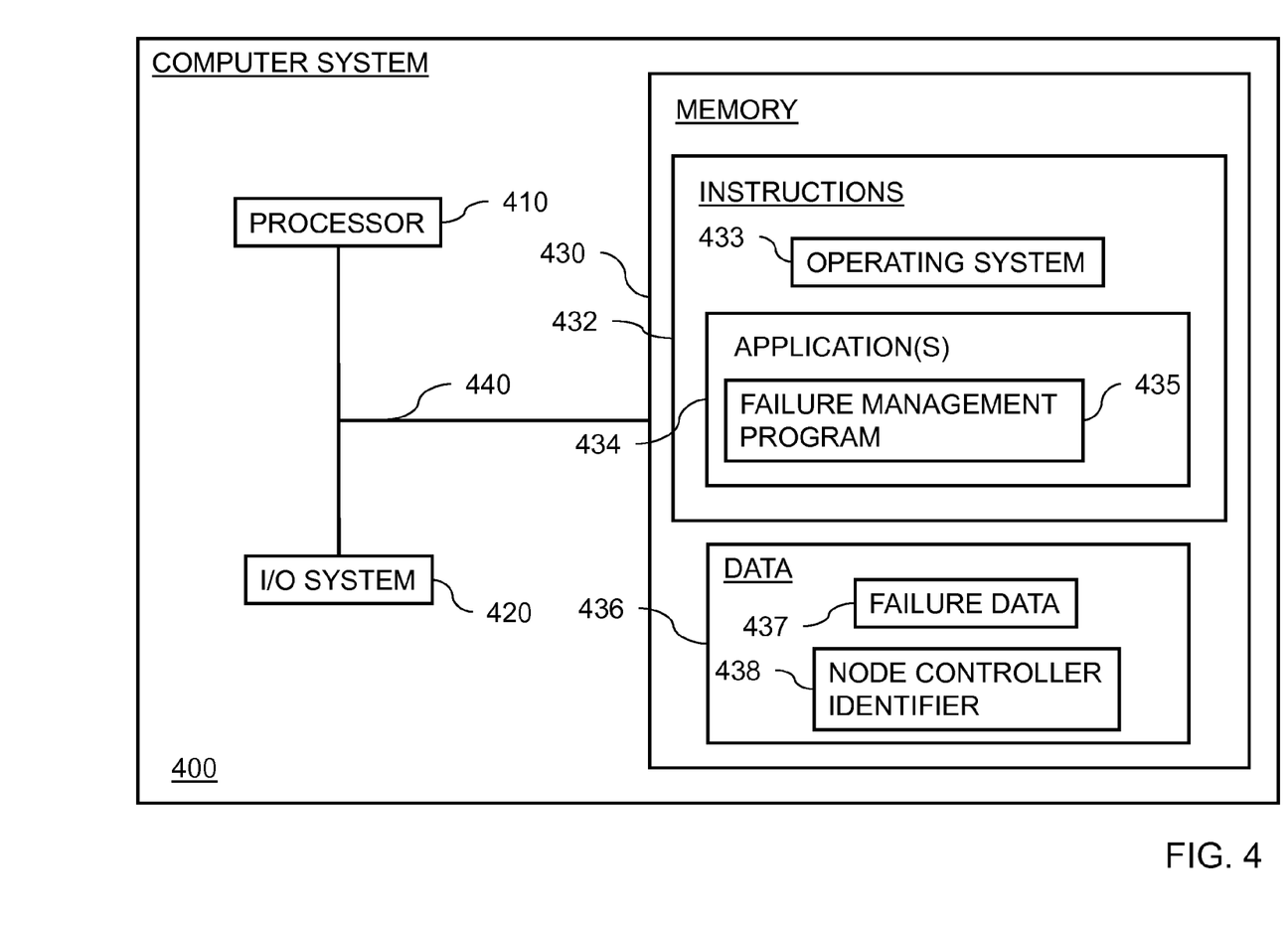
FIG. 4 is a block diagram illustrating an example computer system for managing failure data for a distributed computer system.

FIG. 4 illustrates an example computer system 400 for managing failure data for a distributed computer system. System 400 includes a processor 410, an input/output system 420, and memory 430, which are coupled together by a network 440. As illustrated, computer system 400 is functioning as a node controller, but a system controller could have a similar configuration.

Processor 410 typically includes a logical processing unit (e.g., an arithmetic logic unit) that processes data under the direction of program instructions (e.g., from software). For example, processor 410 may be a microprocessor, a microcontroller, or an application specific integrated circuit. The processor may operate by reduced instruction set computer (RISC) or complex instruction set computer (CISC) principles. In general, the processor may be any device that manipulates data in a logical manner.

Input/output system 420 may include one or more communication interfaces and/or one or more other user interfaces. A communication interface may, for instance, be a network interface card (whether wireless or wireless) or a modem. A user interface could, for instance, be a user input device (e.g., a keyboard, a keypad, a touchpad, a stylus, or a microphone) or a user output device (e.g., a monitor, a display, or a speaker). In general, system 420 may be any combination of devices by which a computer system can receive and output data.

Memory 430 may, for example, include random access memory (RAM), read-only memory (ROM), flash memory, and/or disc memory. Various items may be stored in different portions of the memory at various times. Memory 430, in general, may be any combination of devices for storing data.

Memory 430 includes instructions 432 and data 436. Instructions 432 include an operating system 433 (e.g., Windows, Linux, or Unix) and applications 434, which include a failure management program 435. Data 436 includes the data 437 required for and/or produced by applications 434 and a node controller identifier 438.

Network 440 is responsible for communicating data between processor 410, input/output system 420, and memory 430. Network 440 may, for example, include a number of different types of busses (e.g., serial and parallel).

In one mode of operation, when failure management program 435 determines that a failure is occurring in an associated node, the program may determine a node controller in which to store failure data by examining node controller identifier 438. The failure management program may then begin storing failure data in the identified node controller.

If more failure data than the identified node controller can store is being generated by the event, failure management program 435 may also determine another node controller in which to store failure data. This determination may be made based on an algorithm or a predefined sequence for node controller identifier 438. The failure management program may then store failure data in the subsequently identified node controller.

At some point during the storage process, the progression may call for computer system 400 to store some of the failure data. Failure management program may then store some of the failure data in failure data 437, unless the failure event is catastrophic (e.g., requiring a reboot), in which case the failure management program may skip storing the failure data in failure data 437.

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modification and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for managing failure data for distributed computer systems, and several others have been mentioned or suggested. Moreover, those skilled in the art will readily recognize that a variety of additions, deletions, modifications, and substitutions may be made to these implementations while still achieving failure data management for a distributed computer system. Thus, the scope of the protected subject matter should be judged based on the following claims, which may capture one or more concepts of one or more implementations.

The invention claimed is:

1. A method comprising:
    determining at a service processor of a first node in a distributed computer system that comprises a plurality of nodes whether a failure has occurred in the first node;
    identifying a service processor of a second node in the distributed computer system in which to store failure data if the failure has occurred;
    storing at least part of the failure data in the identified service processor; and
    determining whether there is more failure data to store than the identified service processor can store.

2. The method of claim 1, wherein the failure comprises a hardware error.

3. The method of claim 1, wherein the service processor of a node is a node controller.

4. The method of claim 1, wherein identifying a service processor in which to store failure data comprises determining a service processor identifier.

5. The method of claim 1, further comprising:
    identifying a service processor of a third node in the distributed computer system in which to store failure data if there is more failure data than the identified service processor can store; and
    storing at least part of the failure data in the identified service processor of the third node.

6. The method of claim 1, further comprising:
    determining whether all of the failure data for the failure event has been stored; and
    updating a service processor storage location if all of the failure data has been stored.

7. The method of claim 1, further comprising determining whether communication from the service processor of the first node to a service processor of the distributed computer system is available, wherein identifying a service processor of a second node in the distributed computer system in which to store failure data is performed if communication to the service processor of the distributed computer system is not available.

8. The method of claim 7, further comprising storing the failure data in the service processor of the distributed computer system if communication to the service processor of the distributed computer system is available.

9. The method of claim 7, further comprising:
    determining at the service processor of the distributed computer system whether there is failure data to be retrieved;
    identifying a service processor of a node of the distributed computer system in which at least part of the failure data is stored if there is failure data to be retrieved; and
    retrieving failure data from the identified service processor.

10. The method of claim 9, further comprising:
    determining at the service processor of the distributed system whether there is additional failure data in a service processor of another node;
    identifying a service processor of another node of the distributed computer system in which the additional failure data is stored if there is additional failure data in another service processor of another node; and
    retrieving the additional failure data from the identified service processor.

11. A service processor for a node of a distributed computer system, the service processor comprising:
    a computer memory storing instructions; and
    a processor coupled to the memory, the processor operable, according to the instructions, to:
        determine whether a failure has occurred in the node;

identify service processor of a second node in the distributed computer system in which to store failure data if the failure has occurred;
store at least part of the failure data in the identified service processor; and
determine whether there is more failure data to store than the identified service processor can store.

12. The service processor of claim 11, wherein the service processor of the node is a node controller.

13. The service processor of claim 11, wherein the processor is operable to determine a service processor identifier to identify the service processor in which to store failure data.

14. The service processor of claim 11, wherein the processor is further operable to:
identify a service processor of a third node in the distributed computer system in which to store failure data if there is more failure data than the identified service processor can store; and
store at least part of the failure data in the identified service processor of the third node.

15. The service processor of claim 11, wherein the processor is further operable to:
determine whether all of the failure data for the failure event has been stored; and
update a service processor storage location if all of the failure data has been stored.

16. The service processor of claim 11, wherein the processor is further operable to determine whether communication from the service processor of the first node to a service processor of the distributed computer system is available, wherein identifying a service processor of a second node in the distributed computer system in which to store failure data is performed if communication to the service processor of the distributed computer system is not available.

17. The service processor of claim 16, wherein the processor is further operable to store the failure data in the service processor of the distributed computer system if communication to the service processor of the distributed computer system is available.

18. A distributed computer system, the system comprising:
a system controller operable to store failure node regarding nodes of the distributed computer system; and
a node controller of a first node, the node controller operable to:
determine whether a failure has occurred in the first node,
determine whether communication from the node controller to the system controller is available if the failure has occurred,
store the failure data in the system controller if communication to the system controller sis available,
identify a node controller of a second node in the distributed computer system in which to store failure data if communication to the system controller is not available,
store at least part of the failure data in the identified node controller, and
determine whether there is more failure data to store than the identified node controller can store.

19. The distributed computer system of claim 18, wherein the node controller of the first node is further operable to:
identify a node controller of a third node in the distributed computer system in which to store failure data if there is more failure data than the identified node controller can store; and
store at least part of the failure data in the identified node controller of the third node.

20. The distributed computer system of claim 18, wherein the system controller is further operable to:
determine whether there is failure data to be retrieved;
identify a node controller in which at least part of the failure data is stored if there is failure data to be retrieved;
retrieve failure data from the identified node controller;
determine whether there is additional failure data in a node controller of another node;
identify a node controller of another node of the distributed computer system in which additional failure data is stored if there is additional failure data in another node controller; and
retrieve the additional failure data from the identified node controller.

* * * * *